May 25, 1937.    F. WINKLER    2,081,568
FREEWHEEL COASTER BRAKE WITH BRAKE COUPLING
Filed March 18, 1936
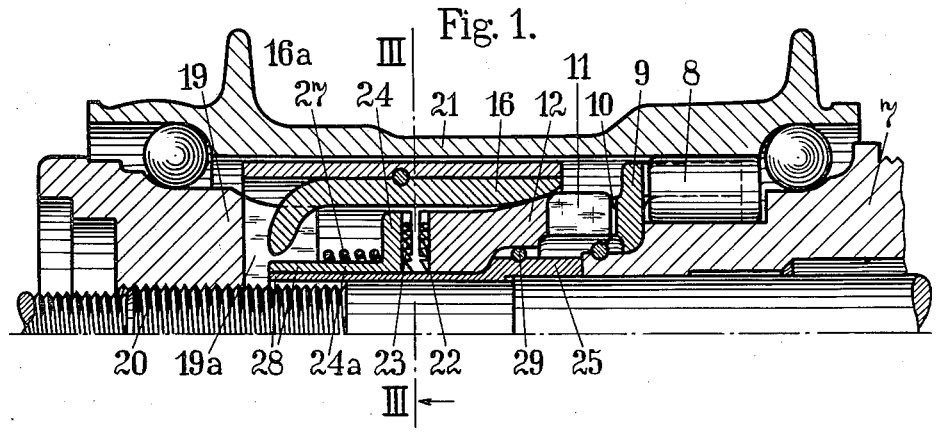
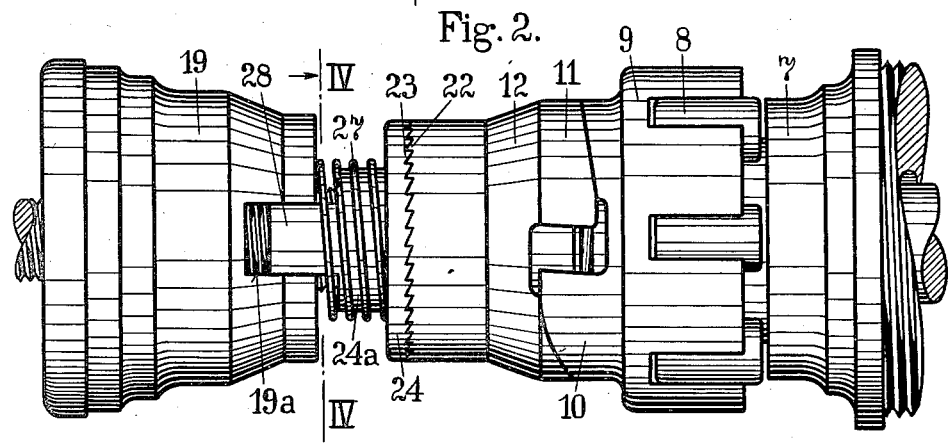
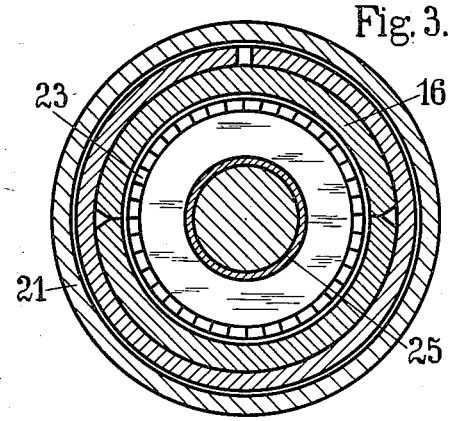 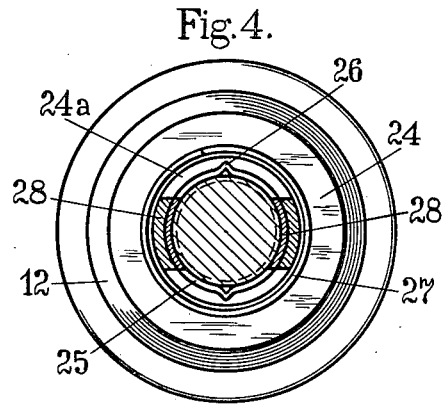
Inventor
FRANZ WINKLER
By
Attorneys Patented May 25, 1937

2,081,568

UNITED STATES PATENT OFFICE 2,081,568

FREE-WHEEL COASTER-BRAKE WITH BRAKE COUPLING

Franz Winkler, Wurzburg, Germany

Application March 18, 1936, Serial No. 69,438
In Germany March 18, 1935

5 Claims. (Cl. 192—6)

The invention relates to improvements in free-wheel hubs with coaster brake, and more particularly to coupling means for temporarily arresting the brake and brake applying elements against rotation with the hub shell or driver respectively.

Coaster brakes for bicycles comprising an expansible brake sleeve and a stationary brake-expanding cone to which the said sleeve is attached with its one end have the drawback that the brake-applying means upon which the other end of the sleeve is supported are not sufficiently held against rotation so that said means can cede the backward pressure transmitted thereon from the driving body, so that it will rotate instead of expanding the brake sleeve.

In accordance with the invention, this inconvenience is overcome by the aid of coupling means connecting the shiftable brake-applying cone member to the stationary brake-expanding cone when the brake is to be applied. For this purpose a coupling is provided which is simple in construction, light in weight, ready to be engaged, while it does not interfere with the application of the brake. In this construction both ends of the brake sleeve are non-rotatably supported by cones which are secured against rotation at the time of braking.

An embodiment of the invention is illustrated in the accompanying drawing which forms a part of this specification.

In the drawing—

Fig. 1 is a longitudinal sectional partial elevation of a free-wheel hub with coaster brake in combination with the device according to the invention;

Fig. 2 is a side view of the operative parts of the free-wheel coaster brake, when the hub shell is removed;

Fig. 3 is a cross section on the line III—III of Fig. 1; and

Fig. 4 is a cross section on the line IV—IV of Fig. 2.

Like numerals designate like parts throughout all figures of the drawing.

In the embodiment represented in the drawing by way of example, the free-wheel coaster brake is composed of a driving body 7 rotatably mounted on the wheel axle 20, a roller clutch 8 coupling the driver to the hub shell 21 on forward drive, a guide or cage ring 9 of the rollers 8, a stationary cone member 19 screwed on the axle 20, a brake sleeve having one of its ends supported on the stationary cone member 19 and relatively non-rotatably secured thereto, and a shiftable cone member 12 placed in the other end of the brake sleeve 16; the two cones being designed to expand the said brake sleeve towards the hub shell. The rollers of the clutch 8 are disposed in cam depressions in the circumference of the driving body 7 and are retained therein by the cage ring 9. These cam depressions have bases eccentric with respect to the axis of the hub, so that each of said depressions will have a varying depth. A roller clutch of this type is shown in the Sachs Patent No. 960,710, issued June 7, 1910.

From the adjacent ends of the guide ring 9 and the cone member 12 axial teeth 10 and 11 respectively project towards each other in mutual engagement. The ends of the respective teeth which are in contact on drive are axial faces so that the cone 12 is carried round with the driver, but on back pedalling their helical faces angularly slide the one on the other displacing the cone 12 towards the cone 19. In order thereby to avoid rotation of the cone 12 a serrated tooth coupling 22 and 23 is provided between the opposite end thereof and the adjacent lateral face of a locking disc 24 non-revolubly guided on the axle, the teeth 22 and 23 being held at a very small distance from one another so that a very little displacement of the cone 12 will suffice to close the coupling as shown in Fig. 2.

This operation is attained through stopping means shiftably supported on the axle 20 and resiliently fixed in their working positions. To this end, the disc 24 by its sleeve-like extension 24a is rigidly attached to a sleeve 25 through longitudinal interlocking furrows or ribs 26 (Fig. 4). On opposite sides of the extension 24a and the sleeve 25 portions are cut away, flat keys 28 being thus formed which fit into a diametral cross groove 19a of the cone 19 and are longitudinally displaceable therein. On the cylindrical extension 24a there is mounted a spring 27 which tends to move the sleeve 25 to the right in Fig. 1 and to adjust the coupling teeth 23 at a given small distance from the teeth 22 when the other end of the sleeve 25 is stopped on the left end face of the driver. The cone member 12 which is rotatably and shiftably supported on the sleeve 25 is limited in its movement by a step of said sleeve 25. A retarding spring ring 29 is arranged on the sleeve 25 in the bore of the cone member 12.

In the position shown in Fig. 1, the sleeve 25 has its right-hand end abutting the driving body 7, and said sleeve is provided with a shoulder which is formed by a step in said sleeve and which engages the cone 12, so that said sleeve 25 and said cone 12 in inoperative non-braking positions will be in predetermined fixed relative positions. Since the locking disc 24 is secured fast to the sleeve 25, said locking disc will be disposed in predetermined position with respect to the cone 12 in inoperative non-braking position.

The free-wheel coaster brake works as follows.

On drive the driving body 7 is as usually connected with the hub shell 21 through the clutch rollers 8 which ride radially outwardly on the cam depressions and frictionally engage the hub shell 21, while the interengagement of the teeth 10 and 11 will cause the brake-expanding cone member 12 to be carried round in the same direction. On free-wheeling through stopping drive, the clutch rollers are automatically disengaged from the rotating hub shell, all other parts housed in said shell remaining immovably in their inoperative positions. Back pedalling will have the effect of moving the clutch rollers 8 radially inwardly in the cam depressions and out of driving engagement with the hub shell 21 and of positively coupling the driver 7 to the cage ring 9 through said rollers to relatively angularly displace the teeth 10 and 11 (see Fig. 2) thereby shifting the cone member 12 and interlocking the teeth 22 and 23, thus immobilizing the cone 12 against rotation. This axial displacement of the movable cone 12 towards the stationary cone 19 will expand the brake sleeve 16 from both its ends and press it on to the inner face of the hub shell 21. By continued back-pedalling the displacement of the cone 12 and consequent expansion of the brake sleeve 16 can be increased, since the lock disc 24 and the sleeve 25 are allowed to move resiliently to the left. On again pedalling forwards, all parts will return to their initial positions.

I claim:

1. In a free-wheel hub with coaster brake of the kind described, the combination with a wheel axle, of a stationary brake-expanding cone fixed on the said axle, an expansible brake sleeve, attached near one end to said cone, a movable brake-expanding cone located in the opposite end of said brake sleeve, and axially resilient means for locking the movable cone against rotation in braking position.

2. In a free-wheel hub with coaster brake of the kind described, the combination with a hub shell, of a driver, a driving coupling, a wheel axle, a stationary brake-expanding cone fixed thereon, an expansible brake sleeve attached near one end to said stationary cone, a shiftable and rotatable brake-expanding cone located in the opposite end of the brake sleeve, means interlocking the driver with said shiftable cone and controlling the movement of the latter, a disc for locking the shiftable cone against rotation during braking action, said disc being resiliently movable during said action and being disposed a predetermined distance from said shiftable cone during inoperative non-braking position, and coupling means oppositely provided on the shiftable cone and the locking disc.

3. In a free-wheel hub with coaster brake of the kind described, the combination with a wheel axle, of a stationary brake-expanding cone fixed on the axle, an expansible brake sleeve attached near one end to said stationary cone, an inversely arranged brake-expanding cone located in the opposite end of the brake sleeve and rotatably and shiftably supported on the axle, coupling means provided on the movable brake-expanding cone, spring-controlled locking means axially resiliently held at a given small distance from said coupling means in inoperative non-braking position and adapted to be engaged with same during braking action, and guide means on said locking means movable in a recess of the stationary brake-expanding cone.

4. In a free-wheel hub with coaster brake of the kind described, the combination with a wheel axle, of a stationary brake-expanding cone fixed on the axle, an expansible brake sleeve attached near one end to said stationary cone, an inversely arranged brake-expanding cone located in the opposite end of the brake sleeve and rotatably and shiftably supported on the axle, coupling means provided on the movable brake-expanding cone, locking means adapted to engage said coupling means, an abutment stopping the locking means at a given small distance from said coupling means in inoperative non-braking position, a spring tending to put the locking means against said abutment and means axially guiding the locking means.

5. In a free-wheel hub with coaster brake of the kind described, the combination with a wheel axle, of a stationary brake-expanding cone fixed on the axle, an expansible brake sleeve attached near one end to said stationary cone, an inversely arranged brake-expanding cone located in the opposite end of the brake sleeve and rotatably and shiftably supported on the axle, coupling means provided on the movable brake-expanding cone, axially resilient locking means adapted to engage said coupling means, a sleeve displaceable on the axle and rigidly connected with the locking means, an abutment stopping said locking means at a given small distance from the coupling means in non-braking position, a spring urging said sleeve against said abutment, axial guide means of the locking means on the stationary cone, and a retarding spring disposed between said sleeve and said shiftable brake-expanding cone, the latter being shiftable and rotatable on said sleeve.

FRANZ WINKLER.